US012358165B2

(12) United States Patent
Delaporte (10) Patent No.: US 12,358,165 B2
(45) Date of Patent: Jul. 15, 2025

(54) ROBOTIC JOINT WITH AN AUTOMATIC TRANSMISSION

(71) Applicant: Avar Robotics, Inc., Brooklyn, NY (US)

(72) Inventor: Stephen E. Delaporte, Devon, PA (US)

(73) Assignee: AVAR ROBOTICS, INC., Brooklyn, NY (US)

( * ) Notice: Subject to any disclaimer, the term of this patent is extended or adjusted under 35 U.S.C. 154(b) by 0 days.

(21) Appl. No.: 18/198,146

(22) Filed: May 16, 2023

(65) Prior Publication Data

US 2023/0364809 A1   Nov. 16, 2023

Related U.S. Application Data

(60) Provisional application No. 63/342,494, filed on May 16, 2022.

(51) Int. Cl.
| | |
|---|---|
| *B25J 17/00* | (2006.01) |
| *B25J 9/10* | (2006.01) |
| *B25J 9/12* | (2006.01) |
| *B25J 13/08* | (2006.01) |

(52) U.S. Cl.
CPC ............... *B25J 17/00* (2013.01); *B25J 9/102* (2013.01); *B25J 9/12* (2013.01); *B25J 13/085* (2013.01)

(58) Field of Classification Search
CPC ..... B25J 17/00; B25J 9/102; B25J 9/12; B25J 9/1025; B25J 13/085
USPC ........................................ 74/490.05, 490.04
See application file for complete search history.

(56) References Cited

U.S. PATENT DOCUMENTS

| | | | | |
|---|---|---|---|---|
| 5,265,489 A | * | 11/1993 | Tohnai ..................... | B25J 9/046 414/917 |
| 5,704,253 A | * | 1/1998 | Book ..................... | B25J 9/1065 414/917 |
| 5,785,162 A | * | 7/1998 | Barksdale ........... | F16D 23/0606 192/53.34 |
| 7,806,020 B2 | * | 10/2010 | Forslund .............. | B25J 19/0029 901/29 |
| 2008/0045374 A1 | * | 2/2008 | Weinberg ............... | H02K 7/116 623/24 |
| 2011/0048157 A1 | * | 3/2011 | Long .................... | B25J 17/0241 74/490.03 |

(Continued)

FOREIGN PATENT DOCUMENTS

| | | | | |
|---|---|---|---|---|
| CN | 201313308 Y | * | 9/2009 | |
| EP | 2096331 A1 | * | 9/2009 | ............... F16H 3/12 |
| WO | WO-2008105292 A1 | * | 9/2008 | ........... B60K 17/043 |

*Primary Examiner* — T. Scott Fix
(74) *Attorney, Agent, or Firm* — ArentFox Schiff LLP; Joseph M. Maraia (57) ABSTRACT

A robotic joint contains a transmission system that can shift from one gear set to another, either automatically or manually, allowing the joint to have different gear ratios that can drive different speeds and output torques. The transmission system is coupled to a driving actuator enclosed within the robotic joint, which may use a secondary actuator to activate a clutch such that it can shift the transmission from one gear set to another. A feedback system using sensors embedded within the robotic joint as well as sensors distributed within the environment may be used to detect the size and weight of an object that the robotic arm and its joints will be manipulating.

16 Claims, 6 Drawing Sheets

(56) References Cited

U.S. PATENT DOCUMENTS

| | | | |
|---|---|---|---|
| 2012/0048047 A1* | 3/2012 | Zhang | B25J 9/102 |
| | | | 74/490.06 |
| 2012/0067150 A1* | 3/2012 | Zhang | B25J 9/104 |
| | | | 74/423 |
| 2014/0107843 A1* | 4/2014 | Okazaki | G05B 19/423 |
| | | | 700/260 |
| 2015/0374573 A1* | 12/2015 | Horst | F16H 19/0628 |
| | | | 74/89.22 |
| 2018/0021949 A1* | 1/2018 | Miura | B25J 9/1638 |
| | | | 700/250 |
| 2018/0266495 A1* | 9/2018 | Kim | F16H 19/0654 |

* cited by examiner

ROBOTIC JOINT WITH AN AUTOMATIC TRANSMISSION

REFERENCE TO RELATED APPLICATIONS

This application claims the benefit of U.S. Provisional Patent Application No. 63/342,494, filed on May 16, 2022, which is incorporated in its entirety herein by reference.

FIELD OF THE INVENTION

The present invention relates generally to robotic joints, and more particularly, to a robotic joint which integrates a transmission that can be automatically or manually controlled.

BACKGROUND OF THE INVENTION

A major limitation to robotic joints and robotic arms in general, is that it can be difficult to achieve a high torque output with an optimized speed output when there are small size constraints to a robot's physical structure. With each joint in an articulated robotic arm, there is always a predetermined load capacity and speed that the joint can achieve. Because torque and speed are inversely proportional to each other when a gearing system is added, as the output speed value increases, the torque output value decreases, and as the output speed value decreases, the torque output value increases. With larger industrial scale robotic arms, high torque and high speeds are achievable because the size of these robotic arms can inherently accommodate larger actuators with higher power outputs. However, with smaller scale robot arms and joints, mechanical advantage is often required to increase the torque output of the motor driving the joint, which typically involves a gearing system, such as a planetary gearing system, a gear train with spur gears, a worm gear drive, or a strain wave gearing system. These kinds of gearing systems are, however, fundamentally constrained to a finite output when considering their speed and toque output capacities are fixed and not adjustable.

There is therefore a need for a mechanical system that can shift its torque and speed output capacities through different gear sets with different ratios within a robotic arm's joints such that it can achieve high speeds with lower torque outputs when objects that the arm is manipulating are smaller and lighter in weight, while still having the ability to shift to slower speeds with higher torque outputs when objects that the arm is manipulating are larger and higher in weight so that the robotic arm or system can carry and move those objects.

SUMMARY OF EMBODIMENTS OF THE INVENTION

A robotic joint contains a transmission system that can shift from one gear set to another, either automatically or manually, allowing the joint to have different gear ratios that can drive different speeds and output torques. The transmission system is coupled to a driving actuator enclosed within the robotic joint, which may use a secondary actuator to activate the clutch such that it can shift the transmission from one gear set to another. A feedback system using sensors embedded within the robotic joint as well as sensors distributed within the environment may be used to detect the size and weight of an object that the robotic arm and its joints will be manipulating.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 1A:
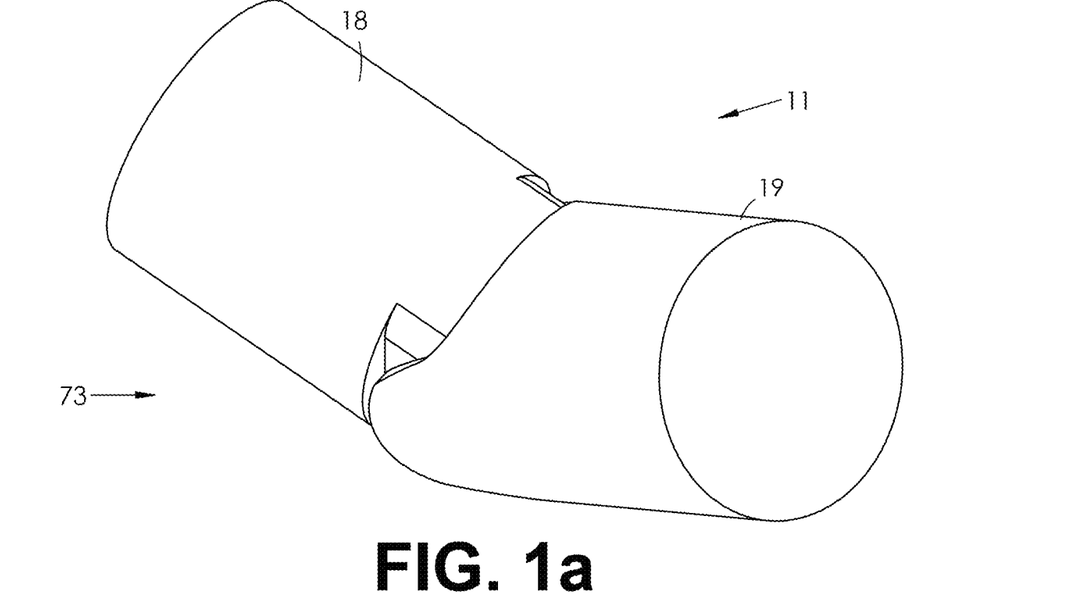
FIG. 1 shows a robotic revolute joint to highlight the two primary shell structures of the joint and how they can rotate into different positions, including a first position where the joint is partially bent, and then a second position below where the joint is in a straightened position.
Figure 1B:
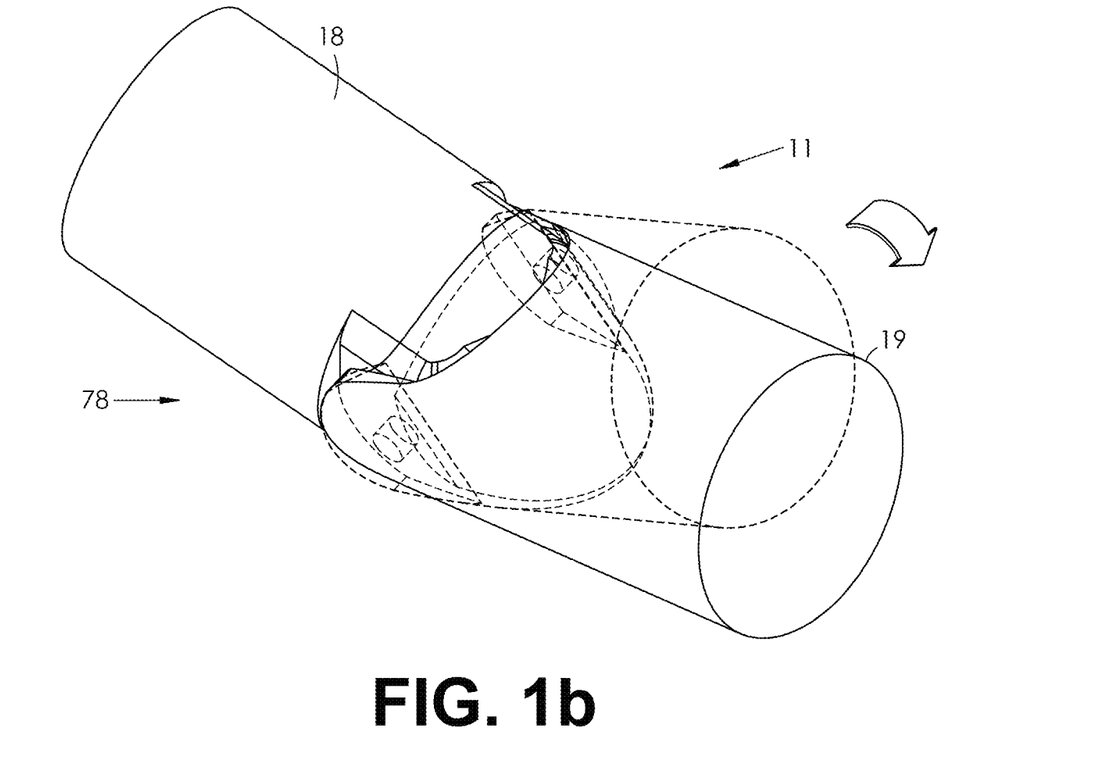

In accordance with the exemplary embodiments shown in FIG. 1a and FIG. 1b, a robotic joint 11 having two shell structures 18 and 19 are shown in a first state 73 where robotic joint 11 is partially bent, and a second position 78, where robotic joint 11 is in a straightened position. These two positions are shown to highlight the general rotational motion of the robotic joint 11, which is driven by an internal transmission system that will be elaborated on in FIG. 2. This joint is also one of two primary kinds of revolute joints that are found in robotic arms, while the second kind is illustrated in FIG. 3.

Figure 2:
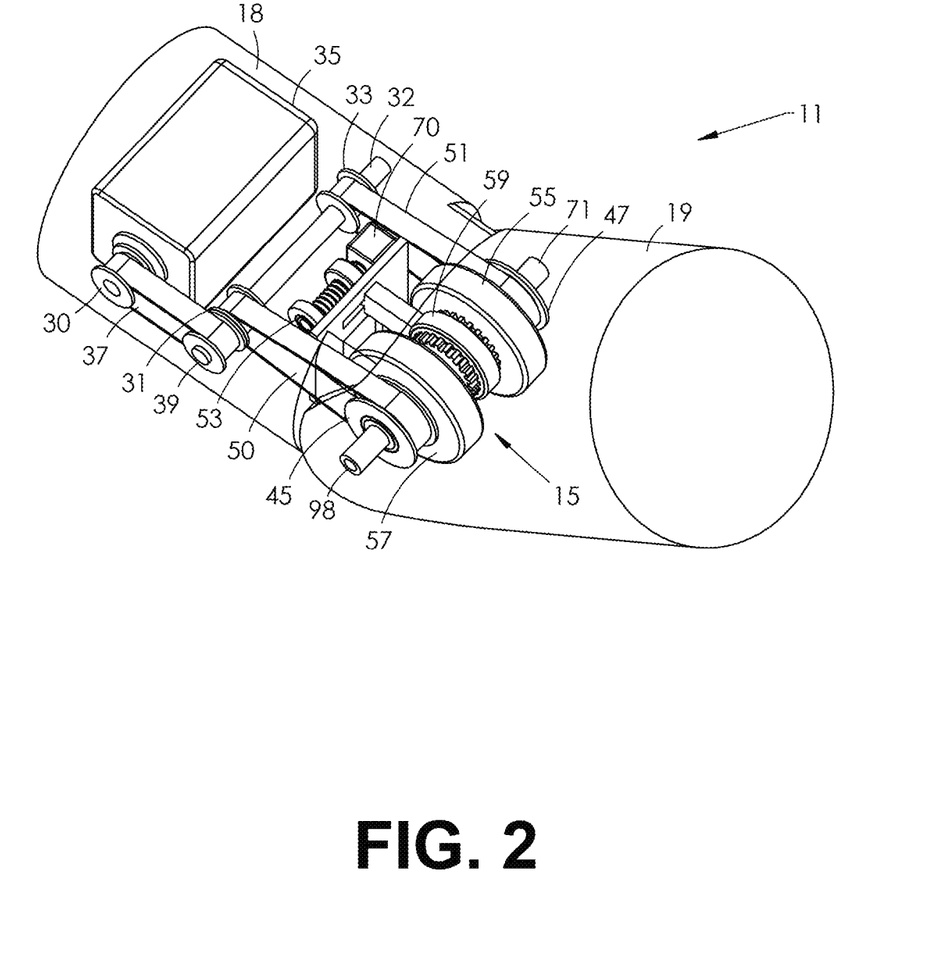
FIG. 2 shows the same robotic joint as in FIG. 1, but with the internal transmission system illustrated having two gearing systems, a clutch and an actuator that can drive the shift between each gearing system, as well as a primary actuator that drives the motion of each gearing system.

FIG. 2 shows the internal drive system and automatic transmission 15 of robotic joint 11, which consists of a primary actuator 35 housed within shell structure 18, that drives a primary timing belt 37 through a first pulley 30 connected to the output shaft of actuator 35, which then drives pulley 39. The motion from pulley 39 is then translated to two pulleys 31 and 33, which are each connected to the same shaft 32 that drive timing belt 50, on one side of shell structure 18, and timing belt 51, on the other side of shell structure 18. Timing belts 50 and 51 then drive pulleys 45 and 47, which are each separately attached to the input shafts of gear boxes 57 and 55, respectively. Each of these gear boxes can either be a gear train with spur gears, a planetary gearing system or a strain wave gearing system. The belts and pulley used to translate motion to the final gearing systems could also be replaced with gears. Belt and pulleys are desirable for the initial translation of motion because they are quiet and can extend a greater length without utilizing as much space. A clutch 59, which can move back and forth to engage input and output shaft 71 with either gear box 57 or 55, is shifted by screw mechanism 53, which is driven by actuator 70. Actuator 70 may be manually activated through a mechanical switch that directly drives clutch 59 to move back and forth using a worm drive, or a ball screw drive, or any other mechanism that can reduce backlash. This actuator may alternatively be activated through an electronic button or a software interface. If the system is in automatic mode, then sensors located internal and/or external to the robot may then signal to the robot if gear box 57 or gear box 55 should be engaged to drive input and output shaft 71. Input and output shaft 71 ultimately then drives shell structure 19 which will be elaborated on in FIG. 5 as the shafts are concentrically rotated with each other, but ultimately clutch 59 determines if one shaft is idle or driving the final output. It is important to note that all pulleys and belts may be replaced with gears and the final output shaft 71 may also just have two different sized pulleys that clutch 59 shifts between. This shift between gear ratios is ultimately determined by the size and especially the weight of an object. Various kinds of sensors may be used to detect the size, geometry, and weight of an object, such as cameras and computer vision, which may be employed to first detect general information about the object. Then additional sensors embedded within the robot arm and its joints, such as strain gauges or force sensing resistors may be used to then detect the weight of the object. This could occur by the robotic arm applying a gripping force to the object to brace it, and then a vertical lifting force to understand the object's weight. These same sensors may be integrated in the environment, such as within a pad or a mat so that when the object is placed on the mat, strain gauges or force sensing resistors can then understand the weight of each object as well as their location in space. Other kinds of sensors such as sonar, lidar, and IR sensors could also be used to better detect what the characteristics are of each object that the robotic arm is planning to manipulate. These sensors ultimately help the robotic arm to process data that will allow it to decide which gear ratio to shift to within the transmission, thus generating a feedback loop so that the transmission can perform automatically. Pre-determined objects might also be programmed into the robotic arm to be used with certain gear ratios. The transmission may also be overwritten with a manual switch that allows the user to change the gear ratio output through a physical switch or a virtual switch with software.

Figure 3:
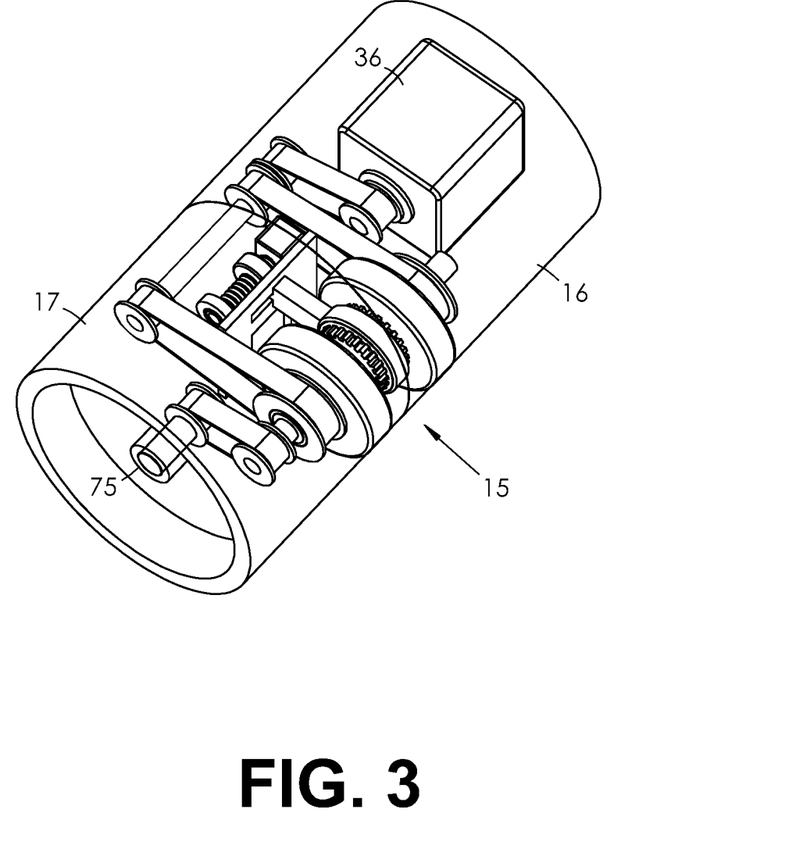
FIG. 3 shows a revolute joint with the same internal transmission system as shown in FIG. 2, but configured to provide a concentric rotation of the output.

FIG. 3 shows a revolute joint with the same automatic transmission 15 as shown in FIG. 2, but configured to provide a concentric rotation of its output, which also has its own driving actuator 36, that is situated in a different orientation parallel to the joint, unlike the revolute joint shown in FIG. 2 which is perpendicular to its joint. The joint from FIG. 3 also has its own output shaft 75, which is situated in a different orientation that is parallel with the length of the joint. This revolute joint is made up of two primary shell structures 16 and 17, whereby automatic transmission 15 is held within shell structure 16, while the output motion from automatic transmission 15 is translated to shell structure 17. At the end of shell structure 17, an additional series of joints could be added to continue the chain of joints within an articulated robot arm, or an end effector might be added at this final output of the joint as well.

Figure 4:
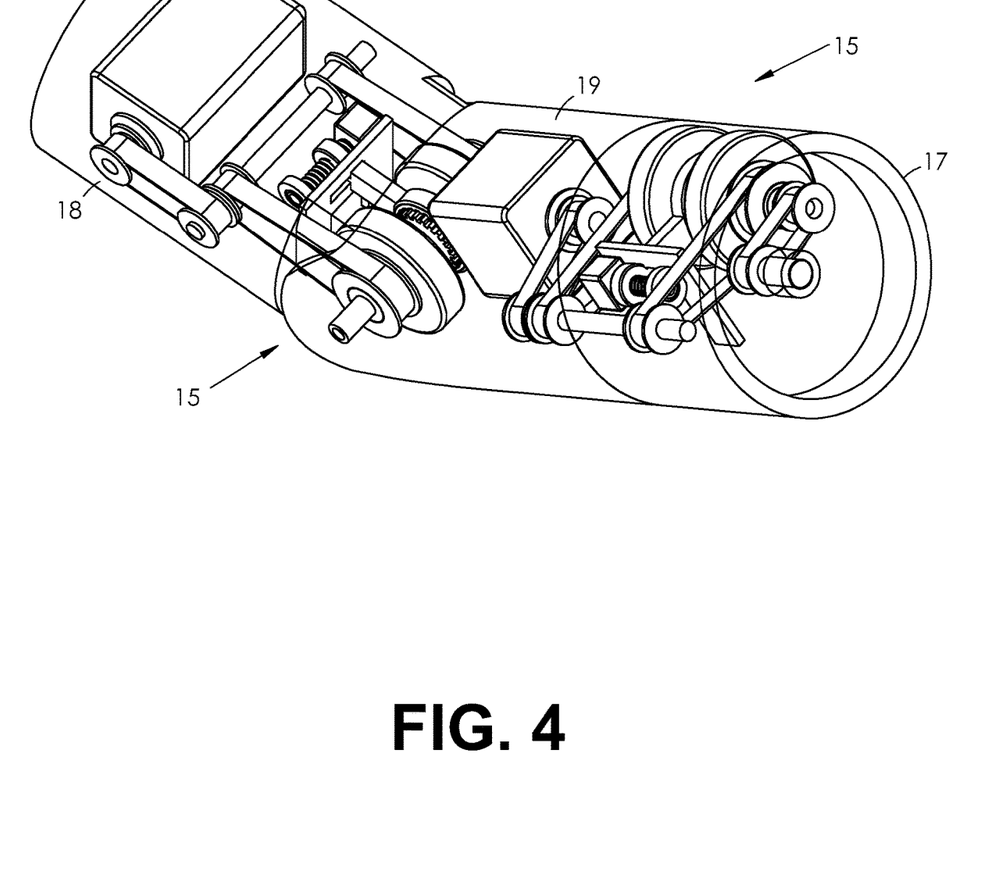
FIG. 4 shows a robotic arm that combines the revolute joint from FIG. 2 and the revolute joint from FIG. 3, each having a transmission.

FIG. 4 shows a robotic arm that combines the revolute joint from FIG. 2 and the revolute joint from FIG. 3, each having their own embedded automatic transmission 15. This highlights how an articulated robot arm can include two joints to provide two degrees of freedom. In this case, shell structure 16 is replaced with shell structure 19 as it is shown in FIG. 2, with shell structure 17 ultimately being used for the final concentric joint's output.

Figure 5:
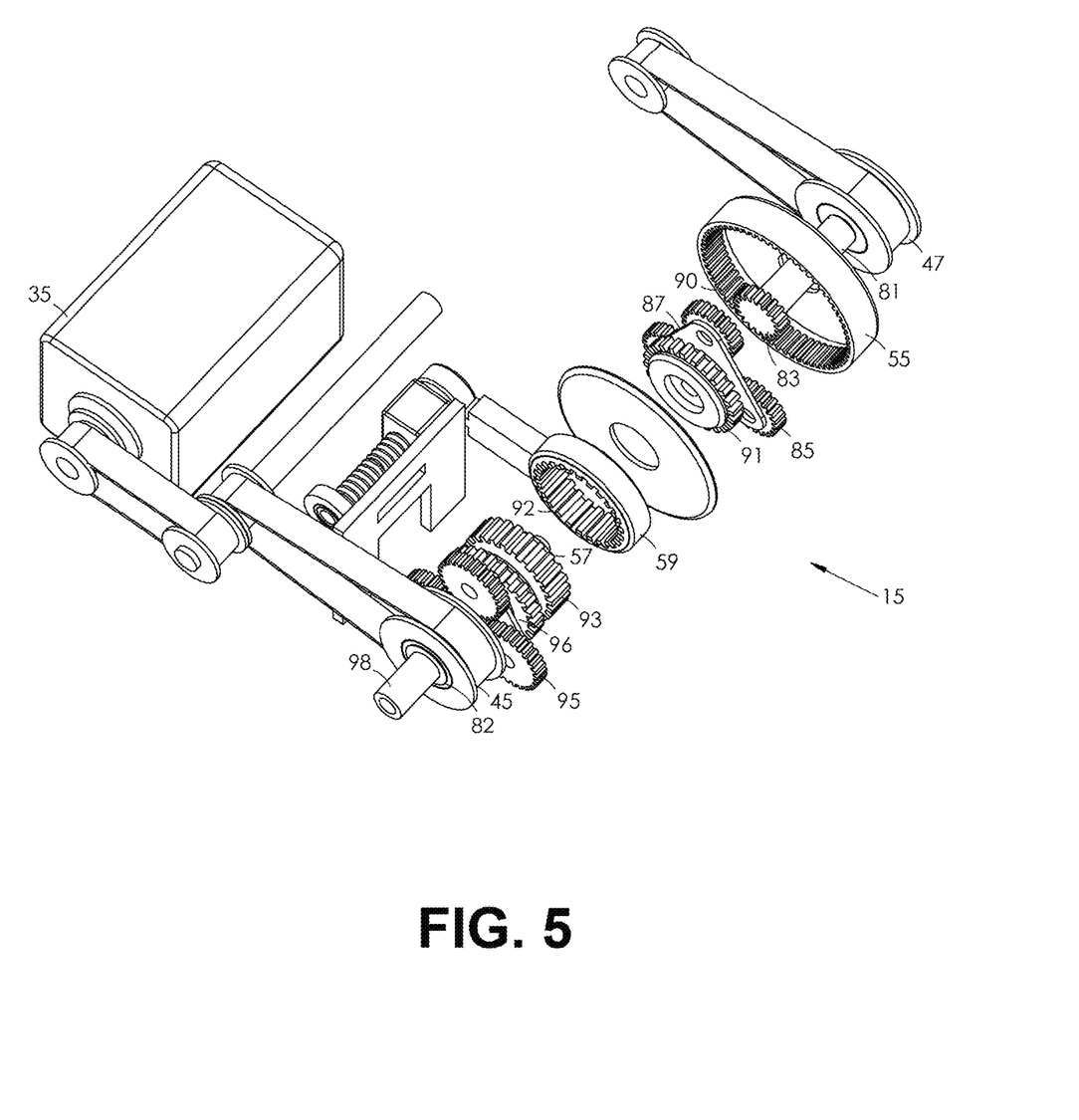
FIG. 5 shows an exploded drawing of the transmission from FIG. 2 and FIG. 3 to highlight the internal components, including two planetary gearing systems, a clutch to switch between each planetary gearing system, as well as a hub, synchronizer rings, and a synchronizer sleeve.
Figure 6:
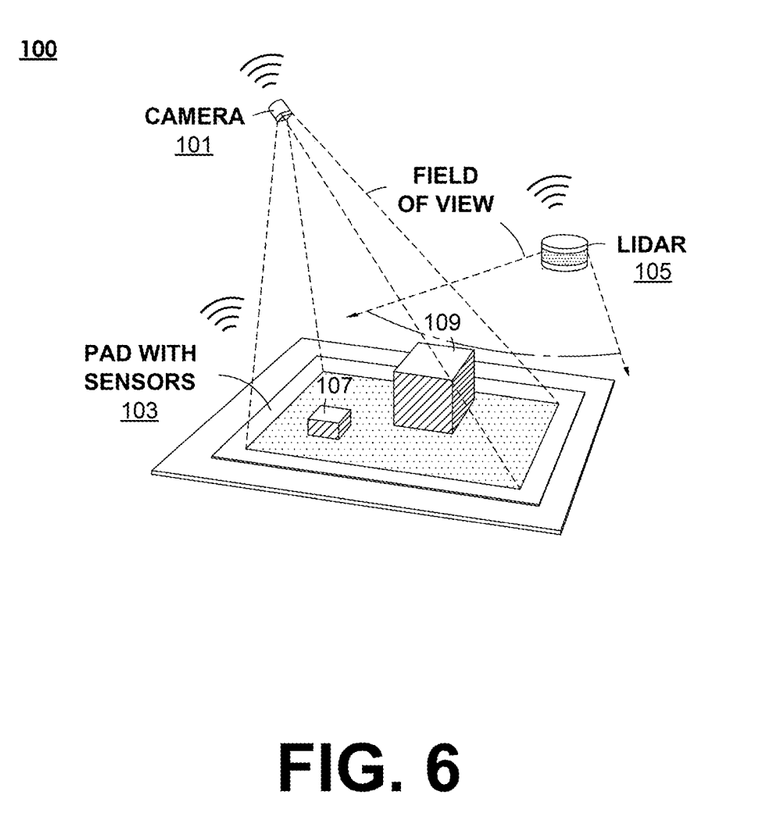

FIG. 5 shows an exploded drawing of the transmission from FIG. 2 and FIG. 3 to highlight the internal components, including two planetary gearing systems 55 and 57, a clutch 59 to switch between each planetary gearing system, as well as a hub 93, to shift the motion between the gearing systems and the output shaft 98, synchronizer rings 96 and 91, and a synchronizer sleeve 92. The clutch 59 is coupled with the synchronizer sleeve 92. Planetary gearing system 55 is made up of an input sun gear 83, which is driven by pulley 47 and input shaft 81, an internal ring gear 90 and a carrier plate 87, with planetary gears 85 that drive the output of the planetary gearing system so that it can be selectively coupled to output shaft 98. Similarly, planetary gearing system 57 has its gearing set that includes planetary gearing 95 which is driven by pulley 45 and its respective input shaft 82, synchronizer ring 96 that ultimately will drive output shaft 98 when clutch 59 and its synchronizer sleeve engage with planetary gearing system 57.

While certain features of the invention have been illustrated and described herein, many modifications, substitutions, changes, and equivalents will now occur to those of ordinary skill in the art. It is, therefore, to be understood that the appended claims are intended to cover such modifications and changes that fall within the true spirit of the invention.

The invention claimed is:

1. A robotic joint comprising:
   two shell structures, whereby the first shell structure houses a transmission made up of multiple gear sets to drive the second shell structure such that each of the gear sets is comprised of a different gear ratio whereby a gear shifting mechanism is driven to move between and engage with each of the gear sets, such that each gear set is driven by its own input shaft located concentrically to the center point of each respective gear set, whereby each gear set input shaft is driven by a shared drive shaft which is located non-concentrically to the center point of both gear sets, while the immediate output shaft of both gear sets is located concentrically to the center point of both gear sets.

2. The robotic joint of claim 1 wherein:
the gear shifting mechanism comprises a clutch.

3. The robotic joint of claim 1 wherein:
the gear sets are comprised of planetary gears.

4. The robotic joint of claim 1 wherein:
the gear sets are comprised of strain wave gears.

5. The robotic joint of claim 1 wherein:
at least one sensor is included to provide feedback for the transmission, such that the sensor feedback can determine which position the gear shifting mechanism will move to or remain in.

6. The robotic joint of claim 1 wherein:
at least one sensor is included within an environment that the robotic joint sits within to wirelessly provide feedback for the transmission.

7. The robotic joint of claim 1 wherein:
a synchronizer sleeve, a synchronizer hub and at least one synchronizer ring is included within the transmission.

8. The robotic joint of claim 1 wherein:
an actuator is included to move the gear shifting mechanism from one gear set to another.

9. The robotic joint of claim 5 wherein:
the at least one sensor is included to detect the weight of an object such that it can provide feedback for the transmission.

10. The robotic joint of claim 5 wherein:
the at least one sensor is a force sensing resistor.

11. The robotic joint of claim 5 wherein:
the at least one sensor is a strain gauge.

12. The robotic joint of claim 6 wherein:
the at least one sensor is a force sensing resistor.

13. The robotic joint of claim 6 wherein:
the at least one sensor is a strain gauge.

14. The robotic joint of claim 6 wherein:
the at least one sensor is a camera.

15. The robotic joint of claim 6 wherein:
the at least one sensor is a lidar sensor camera.

16. The robotic joint of claim 6 wherein:
the at least one sensor is integrated with a pad.

* * * * *